United States Patent [19]

Takano et al.

[11] Patent Number: 4,493,403
[45] Date of Patent: Jan. 15, 1985

[54] PARKING LOCK MECHANISM FOR A SHIFT LEVER

[75] Inventors: Toshio Takano, Hamuramachi; Shinichiro Mura, Mitaka, both of Japan

[73] Assignee: Fuji Jukogyo Kabushiki Kaisha, Tokyo, Japan

[21] Appl. No.: 382,435

[22] Filed: May 26, 1982

[30] Foreign Application Priority Data

May 30, 1981 [JP] Japan .................................. 56-82763

[51] Int. Cl.³ .............................................. B60K 41/26
[52] U.S. Cl. .................................. 192/4 A; 74/411.5; 74/477
[58] Field of Search ........................ 192/4 A, 4 C, 4 R; 74/473 R, 477, 529, 411.5

[56] References Cited

U.S. PATENT DOCUMENTS

| | | | |
|---|---|---|---|
| 3,601,231 | 8/1971 | Kolacz et al. | 192/4 A |
| 3,987,879 | 10/1976 | Longshore et al. | 192/4 A |
| 4,310,081 | 1/1982 | Kolacz | 192/4 A |

FOREIGN PATENT DOCUMENTS 166723 12/1980 Japan .

Primary Examiner—George H. Krizmanich
Attorney, Agent, or Firm—Martin A. Farber

[57] ABSTRACT

A parking lock mechanism for a vehicle having a fluid operated clutch or electromagnetic clutch. A select lever is rotatably and axially slidably mounted on a shaft and a link mechanism is provided for transmitting the operation of a shift lever to the select lever for rotating and sliding it. In a transmission of the vehicle, a parking shifter rail provided for parking operation is connected to the select lever by a fork. An interlocking plate is provided to be moved together with the select lever to be engaged with the fork at a parking position of the select lever. A parking pawl is provided to be operatively engaged with the parking shifter rail, and a parking gear is provided in the transmission so as to be engaged with the parking pawl. When the shift lever is shifted to the parking position, the parking pawl is rotated by the movement of the parking shifter rail and engaged with the parking gear, and the interlocking plate engages with the fork for locking the parking shifter rail. Thus, the transmission system of the vehicle is locked by the parking pawl.

4 Claims, 9 Drawing Figures

FIG. 7
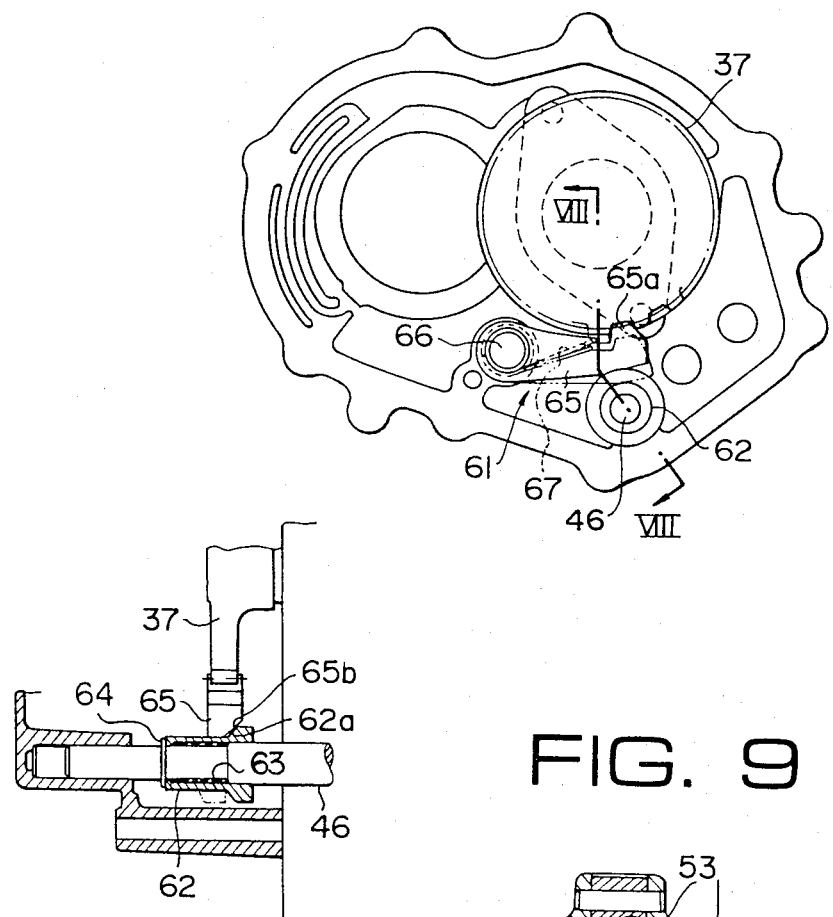
FIG. 8
FIG. 9
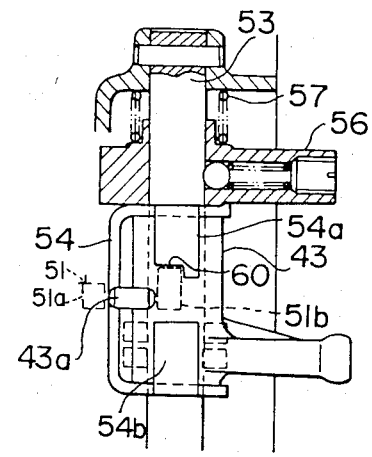

PARKING LOCK MECHANISM FOR A SHIFT LEVER

BACKGROUND OF THE INVENTION

This invention relates to a parking lock mechanism for a shift lever in an automobile equipped with a clutch of the type which is held in released state when the engine is stopped, such as a fluid operated clutch or electromagnetic clutch or others.

In an automobile having a transmission equipped with a torque converter or an electromagnetic clutch, when the engine stops, the clutch is disengaged, so that the engine is disconnected from the power transmission system. Therefore, when parking the automobile with its engine stopped, the braking effect of the engine cannot be used for parking the automobile even if one of the gears of the transmission is kept in engagement with another gear. Therefore, in an automobile of this kind, a parking position for a shift lever is provided in a shift pattern and a lock mechanism is provided to lock one of rotary shafts in the power transmission system.

For example, since a four speed transmission has a vacant position in the shift pattern at an opposite side to the reverse gear position, the parking position is set at the vacant position. When the shift lever is shifted to the parking position, a shifter rail connected to the reverse gear is shifted in the direction opposite to that of the reverse shifting which causes a pawl to engage with a parking gear secured to the rotary shaft. In such a system, if the shift lever slips from the parking position, the parking lock is released which can cause an unforeseen accident. In order to avoid such a danger, a method of locking the parking lock system in the parking position by using the force of a click spring for causing an accentuation in the shift lever operation has been proposed.

Japanese Patent Laid Open No. 55-166723 discloses a lock mechanism for the shift lever. The lock mechanism is provided with a select lever, an engaging portion of which is selectively engaged with one of the shifter arms by operating a shift lever and the engaging portion is engaged with a pawl of an adjacent shifter arm for locking the shift lever. The engaging portion of the select lever is in U-shaped form for the engagement, which will reduce the strength of the engaging portion.

SUMMARY OF THE INVENTION

The object of the present invention is to provide a locking mechanism which has a high strength in construction and a steady operation.

According to the present invention, there is provided an improved parking lock mechanism for a vehicle having a clutch, a transmission, a shift lever, a link mechanism for transmitting the operation of the shift lever to shifter rails in the transmission for selecting change speed gears, and a parking position for the shift lever. The improvement of the invention comprises: a select lever rotatably and axially slidably mounted on a shaft; interlocking means adapted to be moved together with the select lever; first means for transmitting the operation of the shift lever to the select lever for rotating and sliding thereof; a parking shifter rail provided for parking; a fork for connecting the select lever with the parking shifter rail; a parking pawl operatively engaged with the parking shifter rail; a parking gear provided in the transmission so as to be engaged with the parking pawl; second means for converting the movement of the parking shifter rail to the movement of the parking pawl for engaging the pawl with the parking gear; and third means provided in the interlocking means for locking the fork when the select lever is shifted to the parking position.

The present invention will be more apparent from the following description made with reference to the accompanying drawings.

BRIEF DESCRIPTION OF DRAWINGS

FIG. 7 is a sectional view taken along the line VII—VII of FIG. 1;

FIG. 8 is a sectional view taken along the line VIII—VIII of FIG. 7; and

FIG. 9 is a sectional view showing a parking shift condition.

DETAILED DESCRIPTION OF THE PREFERRED EMBODIMENTS

Figure 1:
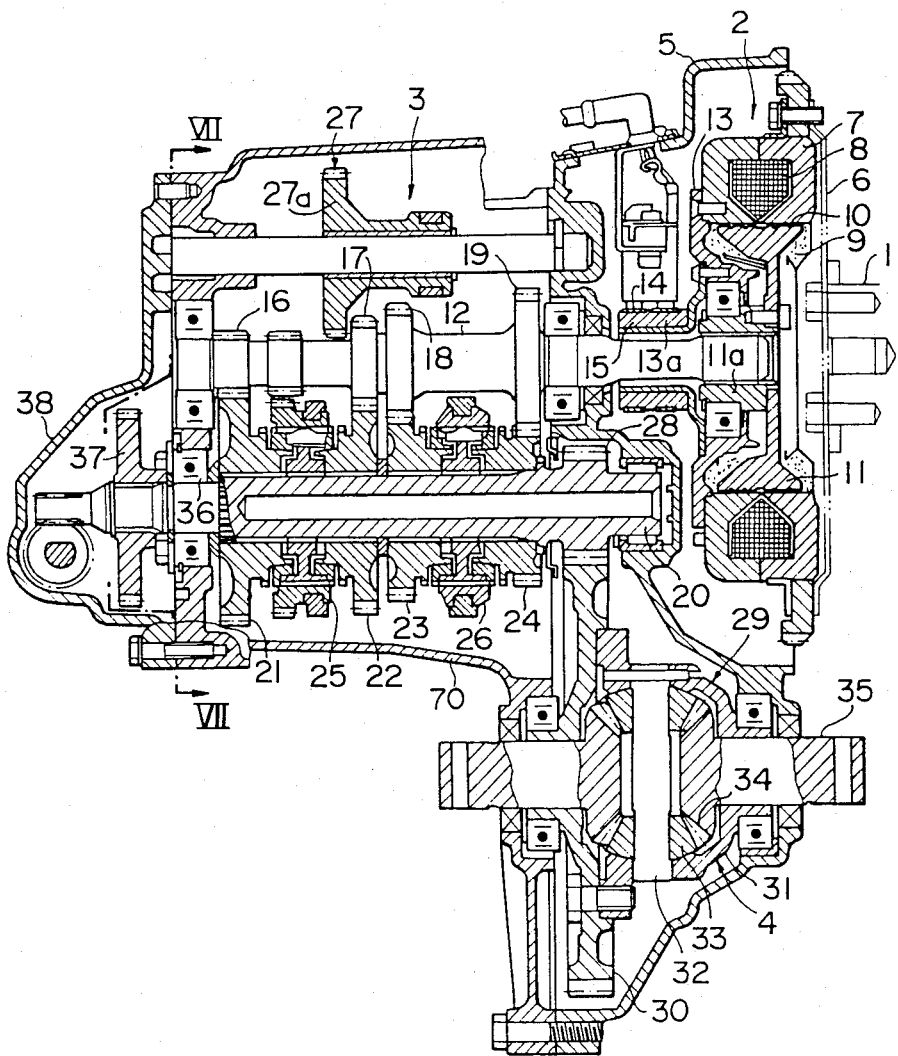
FIG. 1 is a cross-sectional view of an electromagnetic powder clutch used in a system of the present invention.

Referring to FIG. 1 showing a transmission, a crankshaft 1 of an internal combustion engine transversely mounted on a vehicle is connected to a drive plate of an electromagnetic powder clutch 2. The transmission comprises a four-speed transmission 3 and includes a final reduction device 4.

The electromagnetic powder clutch 2 located in a clutch case 5 comprises a drive plate 6 secured with the end of the crankshaft 1, an annular driver member 7 secured to the drive plate 6, the magnetizing coil 8 provided in the drive member 7, and a driven member 11 provided inside the drive member 7. A boss 11a of the driven member 11 is secured by a spline engagement with an input shaft 12 of the transmission 3. The periphery of the driven member 11 is spaced from the drive member 7 by a gap 10. Magnetic powder material is provided in a powder chamber 9 so that the gap 10 can be filled with the powder by the magnetic field generated by exciting the coil 8. A cap 13 is secured to the drive member 7. The cap 13 has a boss 13a coaxial with the input shaft 12, on which slip rings 15 are securely provided. The slip rings 15 are connected to the coil 8 by leads. Brushes 14 are pressed against the slip rings 15.

In such a construction, the drive plate 6 and the drive member 7 rotate together with the crankshaft 1 and the magnetic powder sealed into the powder chamber 9 is moved onto the inner surface of the drive member 7 by centrifugal force. When current is supplied to the coil 8 through the leads, the brushes 14, and the slip rings 15, the drive member 7 is magnetized to produce a magnetic flux passing through the driven member 11. Thus, the magnetic flux causes the powder to aggregate in the gap 10, so that the output of the crankshaft is transmitted to the input shaft 12 through the clutch. A clutch control system is so arranged that the current increases with an increase of the engine speed and that the current is cut off when the engine is stopped, in consideration for the saving of electric power of the battery.

In the transmission 3, first to fourth speed drive gears 16 to 19 are mounted on the input shaft 12. The drive gears 16 to 19 are selectively engaged with driven gears 21 to 24, respectively. The driven gears 21 to 24 are rotatably mounted on the output shaft 20 parallel to the input shaft 12. Each of the driven gears 21 and 22 is adapted to be engaged with the output shaft 20 by operating a synchromesh mechanism 25, and each of the driven gears 23 and 24 is selectively engaged with an output shaft 20 by a synchromesh mechanism 26 in a well known manner. Further, a reverse driven gear 27 is operatively provided in the transmission case 70. Thus, by operating a gear shift lever of the transmission, the driven gear 21 is coupled to the output shaft 20 by the synchromesh mechanism 25 and the first speed is obtained on the output shaft 22; the second, third and fourth speeds, and rear gear operation are similarly obtained.

Further, provided on an end of the output shaft 20 is an output gear 28 which engages with a ring gear 30 of a differential 29 of the final reduction device 4. The output of the output shaft 20 of the transmission 3 is transmitted from the ring gear 30 to gears 34 through a case 31, a spider 32 and pinions 33, and then driving wheels (not shown) of the vehicle through wheel shafts 35.

In accordance with the present invention, a parking gear 37 is secured to the opposite end of the output shaft 20 at the outside of a bearing 36, and is covered by a cover 38.

Figure 2:
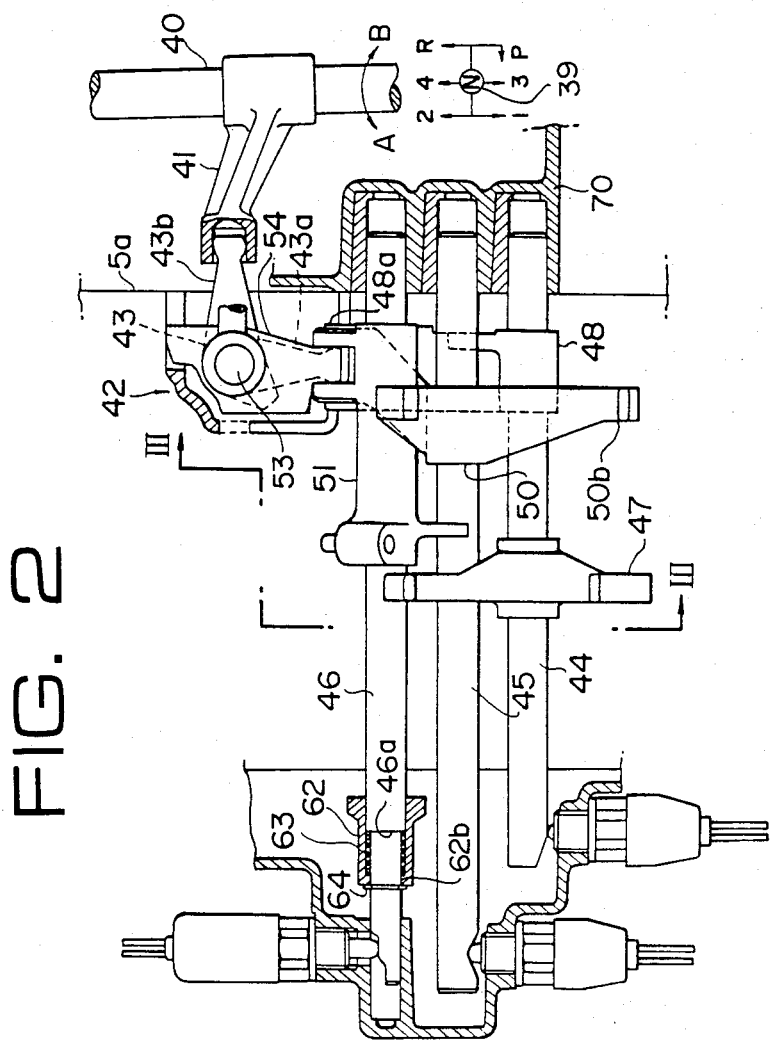
FIG. 2 is a plan view showing a gear shifting system in an embodiment of the present invention.
Figure 3:
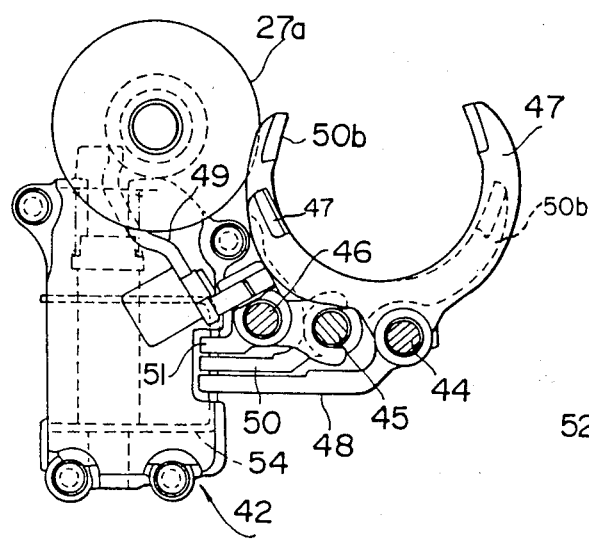
FIG. 3 is a sectional view taken along the line III—III of FIG. 2.

Referring to FIGS. 2 and 3, a control shaft 40 is connected to a shift lever 39 of the transmission. The control shaft 40 is rotatably and axially slidably supported. The control shaft 40 passes the underside of the boss 13a and final reduction device 4 of the transmission 3 and an arm 41 securely mounted on the shaft 40 is engaged with a select lever 43 of a selecting device 42 mounted on a partition 5a between the transmission 3 and the clutch 2. Below the output shaft 20, a shifter rail 44 for the first speed and the second speed, a shifter rail 45 for the third speed and the fourth speed and a shifter rail 46 for the reverse and parking are slidably supported and disposed in a transmission case 70 in parallel in a horizontal plane relative to each other. A shifter arm 48 and a shifter fork 47 for the synchromesh mechanism 25 are secured to the shifter rail 44, a shifter arm 50 having a shifter fork 50b for the synchromesh mechanism 26 is secured to the shifter rail 45, and a shifter arm 51 is secured to the shifter rail 46. The shifter arm 51 is connected to an idler gear 27a of the reverse gear 27 through a reversing link mechanism 49 for shifting the idler gear 27a.

Figure 4:
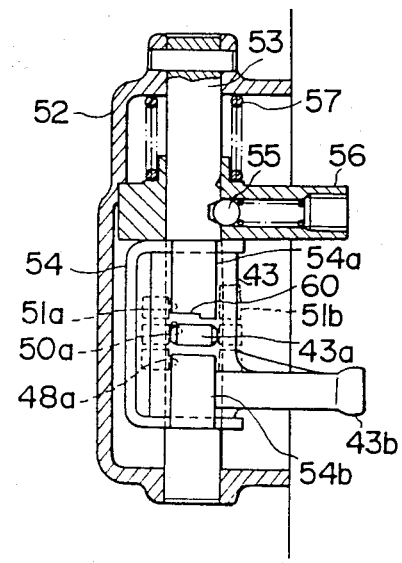
FIG. 4 is a sectional view showing a principal portion of the system of the present invention.
Figure 5:
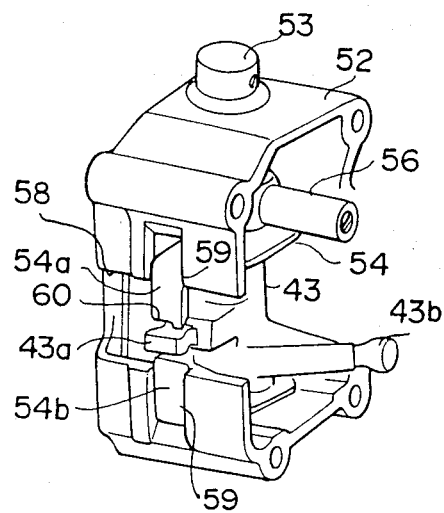
FIGS. 5 and 6 are perspective views showing a portion shown in FIG. 4.
Figure 6:
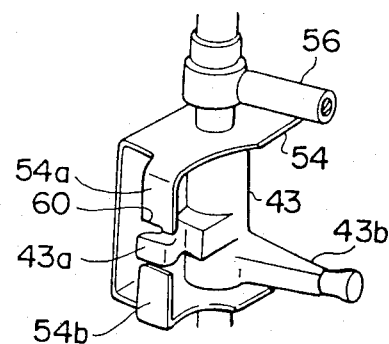

The selecting device 42, as shown in FIGS. 4 to 6, has a vertical shaft 53 secured to a frame 52. The select lever 43 is rotatably and axially slidably mounted on a lower portion of the shaft 53. An interlock plate 54, embracing the select lever 43, is axially slidably mounted on the shaft 53 so as to be shifted together with the select lever 43. On the upper portion of the shaft 53, a plunger 56 is slidably mounted and downwardly biased by a spring 57. The plunger 56 has a lock ball 55 engaged with a notch of the shaft 53 by a spring. The select lever 43 has an engaging portion 43a and a connecting portion 43b making an angle of about 90°. The connecting portion 43b is engaged with an end of the arm 41 secured to the control shaft 40 and the engaging portion 43a is located in a window 58 formed in the frame 52. The interlock plate 54 is provided with upper and lower projections 54a and 54b which are adjacent to the engaging portion 43a at top and bottom surfaces. Both projections 54a and 54b engage with slots 59 of the frame 52, so that rotation of the projections is prevented. The engaging portion 43a of the select lever 43 and the projections 54a and 54b of the interlock plate 54 are substantially equal in width and these portions are vertically aligned at the neutral position of the control shaft 40. At the neutral position, forks 48a, 50a and 51a of the shifter arms 48, 50 and 51 are vertically aligned as shown by dotted lines in FIG. 4. The right-hand engaging portion 51b of the arm 51 has a thickness larger than the other engaging portion 51a and is adapted to engage with a hook portion 60 of the projection 54a as described hereinafter. Two other right-hand engaging portions (not numbered) of the forks 50a and 48a have the same thickness as the left-hand ones. These three engaging portions of the arms 51, 50 and 48 form a U-shaped portion, respectively. The position of the engaging portions is shown as dotted lines in FIG. 4 and FIG. 9.

Referring to FIGS. 2, 7 and 8, a parking lock device 61 is provided with a cam 62 slidably mounted on the shifter rail 46 and with a parking pawl 65. The cam 62 encloses a coil spring 63 which is provided around the shifter rail 46 and disposed between a shoulder 46a and an inner flange 62b so that the cam 62 is biased toward snap ring 64 on the shifter rail 46. The parking pawl 65 is rotatably mounted on a shaft 66 and urged toward the parking gear 37 by a spring 67 so that a pawl 65a may engage with one tooth of the gear 37. As shown in FIG. 8, the cam 62 has a bevel portion 62a which engages with a bevel portion 65b of the pawl 65.

In operation, when the control shaft 40 is turned in the direction of A (FIG. 2) by operating the shift lever 39 for selecting the first speed or second speed, the select lever 43 and interlock plate 54 are moved downwardly by the arm 41. Accordingly, the upper projection 54a of the interlock plate 54 engages with the forks 50a and 51a of the upper shifter arms 50 and 51 to inhibit the movement of the shifter rails 45 and 46, and the engaging portion 43a of the select lever 43 engages with the fork 48a of the lowermost shifter arm 48. Thus, when the control shaft 40 is axially shifted by the operation of the shift lever 39, the select lever 43 is rotated to shift the shifter rail 44 and the shifter fork 47 so as to select the first or second speed. When the control shaft 40 is shifted to the neutral position, the select lever 43 and the interlock plate 54 are moved upwardly, so that the upper portion of the interlock plate 54 abuts on the plunger 56. In this position, as clearly in FIG. 4, the upper and lower projections 54a and 54b engage with the forks 51a and 48a of the shifter arms 51 and 48, and the engaging portion 43a engages with the fork 50a of the shifter arm 50. Thus, the third speed or the fourth speed is selected by the operation of the shift lever 39 in a similar manner as described above with respect to the first and second speeds.

When the control shaft 40 is rotated in the direction B by operating the shift lever 39, the select lever 43, interlock plate 54 and plunger 56 are moved upwardly against the spring 57, so tht the forks 50a and 48a of the shifter arm 50 and 48 are restricted by the lower projection 54b and the engaging portion 43a engages with the fork 51a of the uppermost shifter arm 51. In such a condition, when the control shaft 40 is shifted to the reverse position R (FIG. 2), the shifter rail 46 is shifted to the right thereby to select the reverse gear 27.

When the engine is stopped and the control shaft is shifted to the parking position P by operating the shift lever 39, the shifter arm 51 is shifted to the left as shown in FIG. 9 by dotted line and also the shifter rail 46 is shifted to the left in FIG. 2. Accordingly, the cam 62 is moved to the left by the spring 63 (FIG. 8), so that the parking pawl 65 is rotated about the shaft 66 by the cooperation of bevels 62a and 65b. Thus, the pawl 65a of the parking pawl 65 engages with the parking gear 37, so that the output shaft 20 is locked by the parking lock device 61. Thereafter, when the shift lever 39 is released from the operator's hand, the plunger 56, interlock plate 54 and select lever 43 are moved downwardly by the spring 57, so that the hook portion 60 of the projection 54a engages with the right hand engaging portion 51b of the arm 51 as shown in FIG. 9. Thus, the parking lock device 61 is prevented from returning, that is the pawl 65a and the parking gear 37 are held in engagement. As a result, the shift lever 39 is shifted from the parking position to the left as shown by the arrow in FIG. 2, namely, in the direction of rotation of the control shaft 40.

In order to release the parking lock device 61, the shift lever 39 is shifted slightly to the right in FIG. 2 to elevate the projection 54a to remove the hook portion 60 from the engaging portion 51b. Thus, the pawl 65a is disengaged from the parking gear 27 by shifting the shift lever 39 to release the parking lock.

In accordance with the present invention, when the shift lever is shifted to the parking position, the parking lock device 61 is locked by the hook portion 60. Thus, the output shaft of the transmission is securely locked in the parking condition.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An improved parking lock mechanism for a vehicle having a clutch, a transmission including a transmission case, a shift lever, a link mechanism for transmitting the operation of said shift lever to shifter rails in said transmission for selecting change speed gears, and a parking position for said shift lever, the improvement comprising:
   a shaft securely mounted on said transmission case;
   a select lever rotatably and axially slidably mounted on said shaft;
   interlocking means adapted to be slid together with said select lever;
   first means for transmitting the operation of said shift lever to said select lever for rotating and sliding thereof;
   a parking shifter rail provided for parking;
   a fork secured to said parking shifter rail and operatively engaged with an end of said select lever so as to transmit the rotary movement of the select lever to the shifter rail;
   a parking pawl operatively engaged with said parking shifter rail;
   a parking gear secured to an output member of said transmission so as to be engaged with said parking pawl;
   second means for converting the movement of said parking shifter rail to the movement of said parking pawl for engaging said pawl with said parking gear; and
   third means provided in said interlocking means for locking said fork when said select lever is shifted to the parking position.

2. The parking lock mechanism according to claim 1 further comprising
   a spring means for biasing said interlocking means to the locking position and for engaging a hook portion formed in said interlocking means with said fork.

3. The parking lock mechanism according to claim 2 wherein said interlocking means is an interlocking plate slidably mounted on said shaft so as to be shifted together with said select lever, and said third means is a hook portion provided in an end portion of said interlocking plate so as to be engaged with said fork.

4. The parking lock mechanism according to claim 2 wherein said second means comprises a cam provided on said parking shifter rail and a bevel portion provided on said parking pawl so as to be co-operated with said cam.

* * * * *